United States Patent Office 3,223,504
Patented Dec. 14, 1965

3,223,504
METHOD OF BENDING GLASS SHEETS
James Hershel Cypher, New Kensington, and Clement Edward Valchar, Tarentum, Pa., assignors to Pittsburgh Plate Glass Company, Pittsburgh, Pa., a corporation of Pennsylvania
No Drawing. Filed Oct. 7, 1963, Ser. No. 314,553
4 Claims. (Cl. 65—106)

The present application is a continuation-in-part of application Serial No. 178,278 filed March 8, 1962, for Bending Glass Sheets which has matured into U.S. Patent No. 3,148,968.

The present invention relates to improvements in bending glass sheets by press bending heat-softened glass sheets into bent shapes, and particularly to an improved cover material for rigid members which apply bending pressure to the opposite surfaces of the heat-softened glass sheets to bend the latter into a desired configuration.

Glass sheets have been bent by heat-softening one or more flat glass sheets supported horizontally or obliquely over a suitable shaping surface until the glass conforms thereto by gravity sagging. Such a method fails to control the glass shape within very close tolerances.

In another method, the glass sheet is heated to an elevated temperature and bending accelerated by applying pressure to one or both of the opposite major surfaces of each sheet by means of a pair of oppositely disposed complementary shaped male and female pressing members. The pressing members act like forming dies that engage the opposite surfaces of the glass for a brief interval sufficient to shape the flat glass into its desired curvature. In this respect, the action is very much like that of a die stamping operation. Such bending of glass has been termed "press bending" by the art, and is characterized by closer conformity to tolerance than gravity sagging.

Considerable difficulty has been met prior to the present invention in employing press bending. Metal shaping members or other materials having a high thermal conductivity could not be used to advantage because of their tendency to chill crack the glass. When pressing members of cast iron are heated, for example, they are subject to oxidation and high temperature effects that cause the glass contacting surfaces to depart from their desired configuration and impose their imperfections in the viewing surfaces of the glass. Plaster of Paris molds can only tolerate limited temperatures and length of contact time.

As a consequence, the glass press bending art has employed fiber glass cloth covers to insulate the surface of the press members from direct contact with the heated glass. Prior to the present invention, the art had suggested the use of a plurality of layers of woven fiber glass cloth impregnated with a highly heat resistant plastic material filling the interstices of the woven fiber glass cloth. U.S. Patent No. 2,560,599 to Joseph D. Ryan shows this teaching.

Despite this precaution, the woven fiber glass cloth surface presented its imprint to the heat-softened glass sheet surface. Pressurized contact impressed the overall effect of the woven fiber glass cloth on the glass surface. In addition, the glass sheet shaped by pressing members having woven fiber glass cloth covers were characterized by a defect known as "chill ripple distortion." This defect resulted from the non-uniform refractive index of the pressed glass surfaces caused by non-uniform cooling of the glass surfaces undergoing shaping.

The present invention has discovered that fiber glass cloth covers for press bending molds have less tendency to mar the major glass surfaces or cause "chill ripple distortion" if the fiber glass cloth covers are composed of bulky or textured yarns, for example, those having texturized surfaces characteristic of those described in U.S. Patent No. 2,783,609, issued on March 5, 1957, to Alvin L. Breen and the like. Texturized yarns which exemplify the bulky or textured yarns that may be used in carrying out this invention are composed of a plurality of substantially continuous, individually convoluted filaments, as described in the aforesaid patent. The individual filaments of texturized yarns have coils, loops or whorls at random intervals along their length. The loops comprise complete loops formed by a filament coupling back upon itself, crossing itself and then proceeding in substantially the original direction. The loops may be circular or of ring-like shape, but assume more complex shapes under pressure. The characteristics of these yarns are their bulkiness and the presence of a multitude of filament ring-like loops irregularly spaced along their surface. These filament loops contribute to bulkiness, but the less obvious convolutions of the filaments within the yarn provide lateral interfilament spacing which is important in producing bulk. Woven fiber glass cloth composed of either straight textured yarns or core and effect yarns can also provide improved optical properties for surfaces of press bent glass sheets when used as covers for press bending molds as a substitute for fiber glass fabrics composed of nontexturized yarns.

At first, the glass bending art attempted to utilize glass cloth covers composed of yarns having the smoothest possible surface. However, after experiments were performed with woven fiber glass cloth covers composed of texturized yarns, it became apparent that they were superior to woven fiber glass cloth covers composed of yarn having smooth surfaces. This resulting improvement in optical properties of the surfaces of the press bent glass sheets was entirely unexpected.

It is believed that texturized yarns improve the result obtained from woven fiber glass covers because texturizing provides the yarns with a fuzzy external surface. This fuzzy external surface provides the yarns with a cushioning effect and reduces the localized pressure of the yarn on the heat-softened glass that causes the imprint to be pronounced, particularly at the high pressure points located at each intersection of the warp threads and fill threads.

Texturizing woven fiber glass cloth provides resiliency to the yarns comprising the cloth and also improves the thermal insulation properties of the fiber glass cloth, reduces the likelihood of imposing the overall pattern of the weave on the heated glass surface and tends to make an indistinct pattern rather than a distinct pattern at the point of intersection of the warp and the fill threads.

Furthermore, texturizing tends to mask a wrinkled effect in the glass surface reflecting the wrinkling of the glass cloth resulting from the tendency of woven fiber glass cloth to stretch out of intimate contact with the shaping surface of the pressing members by virtue of its lack of resiliency. Such wrinkling of the fiber glass cloth also accelerates rupture of the yarn, unless the yarn is texturized. The texturizing of the yarns blurs out the wrinkles and provides a suitable surface for the layman who looks through rather than at the glass sheet.

The covers are draped over the shaping surfaces and secured to a pair of frames flanking each shaping member and having a shape conforming to the shaping surface it flanks. Such a securing means is disclosed in application Serial No. 98,667 of Lee R. Robinson, filed March 27, 1961, now U.S. Patent No. 3,144,319.

EXAMPLE

In order to determine the feasibility of the present invention, curved sidelights of tempered glass having a nominal thickness of ¼ inch bent to a uniform radius of curvature of 60 inches were produced by gradual heating for a period of about 4 minutes in a tunnel-like furnace maintained at 1250 degrees Fahrenheit. This was followed by removing the glass from the furnace into a glass shaping station. About 4 seconds were required for this movement. Then glass shaping members located on each side of the vertically supported glass sheet moved into pressurized contact with the opposite surfaces of the glass sheet. It took about 2 seconds for the glass shaping members to close and impress their shapes onto the opposite major surfaces of the heat-softened glass sheet.

The shaping members were held in pressurized contact with the opposite surfaces of a glass sheet for about 2 seconds and then were retracted. The glass sheets were immediately transported from the shaping station to a quenching station where air blasts were directed against the opposite major surfaces to quench the glass and impart a temper thereto. After the glass sheets were chilled, they were inspected for surface markings.

The glass shaping members were made of cast iron. The same shaping members were employed for the tests tabulated below in Table I. Different fiber glass cloth covers were used over their shaping surfaces, some texturized and some nontexturized. Optical inspection of the bent glass sheets by expert inspectors provided a test for the various fiber glass cloth covers employed covering the glass shaping members during press bending.

Glass press bending molds provided with the fiber glass cover materials enumerated in Table I below produced bent glass sheets whose optical properties were tested. The best optical properties were obtained using cover material A composed of texturized yarn. Cover material B composed of texturized yarn also provided improved results over those obtained with nontexturized woven fiber glass cloth covers such as cover materials C and D. It was concluded from this test that texturizing both the warp and fill yarns produced the best results and texturizing only one of the yarns, that is the fill yarn, produced some improvement over the nontexturized cloths previously used.

The present invention resulted in an upgrading of the commercial requirements for optical properties of press bent glass sheets. Whereas cover materials C and D met commercial requirements prior to the present invention, the higher standards set by the present invention made glass sheets produced by prior art press bending apparatus employing nontexturized fiber glass cloth unacceptable to the discriminating customer.

*Table I.—Cover material*

A. Woven fiber glass cloth, warp 28, fill 30 Core and effect yarn 150–2/2–0 in both warp and fill, 2 ends in core, 5 percent overfeed, 2 ends in effect, 80 percent overfeed B. Woven fiber glass cloth, warp 28, fill 30 Fill yarn 150–1/2–3.8S 10 percent texturized Warp yarn 150–1/2–3.8S nontexturized C. Nontexturized woven fiber glass cloth Type ECC 181, 57 ends per inch ×54 picks per inch; 225–1/3 warp and fill yarns 8 Harness satin weave D. Nontexturized woven fiber glass cloth Type ECC 184, 42 ends per inch ×36 picks per inch; 225–4/3 warp and fill yarns 8 Harness satin weave From the experiments performed hereinabove, it was concluded that texturizing fiber glass cloth covers improved the optical properties of press bent glass sheets. It was also determined that woven fiber glass cloth covers formed of either straight yarns or core and effect yarns produced better results when they were formed from texturized rather than nontexturized yarn.

In our copending application Serial No. 178,278, filed March 8, 1962, which has matured into U.S. Patent No. 3,148,968, further improvements involving the employment of knit fiber glass fabrics and texturized knit fiber glass fabrics as covers for press bending molds are described and claimed.

The present invention has been described for the purposes of illustration rather than limitation. It is understood that many variations of texturizing woven fiber glass cloth may be employed between the shaping surface of a glass shaping member and a glass to be shaped into conformance with the shape of the complementary glass shaping members within the purview of this invention, provided the woven fiber glass fabric employed is texturized to sufficient extent to provide a fuzzy surface rather than a smooth surface in contact with the glass. Such fuzzy surface must provide sufficient thermal insulation not found in prior art fiber glass fabrics composed of nontexturized yarn.

The invention shown and described in this disclosure represents an illustrative preferred embodiment. It is understood that various changes may be made without departing from the spirit of the invention as defined in the claimed subject matter which follows.

What is claimed is:

1. In the art of bending heat-softened glass sheets wherein a heat-softened glass sheet is shaped by pressurized contact between a pair of shaping members having substantially complementary shaping surfaces opposing one another and wherein fiber glass fabric is interposed between each major surface of the glass sheet and the shaping member it faces, the improvement comprising employing a woven fiber glass fabric of texturized fiber glass yarn.

2. The improvement according to claim 1, wherein the texturized fiber glass yarn is composed of core and effect yarn.

3. The improvement according to claim 1, wherein the woven fabric comprises warp yarn and fill yarn wherein at least one of the yarns is texturized.

4. The improvement according to claim 3, wherein the woven fiber glass fabric comprises texturized fill yarn and texturized warp yarn.

References Cited by the Examiner

UNITED STATES PATENTS

| | | | |
|---|---|---|---|
| 2,560,599 | 7/1951 | Ryan | 65—374 X |
| 3,148,968 | 9/1964 | Cypher et al. | 65—106 |

DONALL H. SYLVESTER, *Primary Examiner.*